United States Patent
Mori (10) Patent No.: US 9,065,676 B2
(45) Date of Patent: Jun. 23, 2015

(54) COMMUNICATION CIRCUIT, RELAY CONNECTING CIRCUIT, AND COMMUNICATION NETWORK

(75) Inventor: Setsuro Mori, Ritto (JP)

(73) Assignees: RIB LABORATORY, INC., Shiga Prefecture (JP); HONDA MOTOR CO., LTD., Tokyo (JP)

(*) Notice: Subject to any disclaimer, the term of this patent is extended or adjusted under 35 U.S.C. 154(b) by 246 days.

(21) Appl. No.: 12/981,765

(22) Filed: Dec. 30, 2010

(65) Prior Publication Data
US 2011/0176560 A1  Jul. 21, 2011

(30) Foreign Application Priority Data

Jan. 15, 2010 (JP) .................................. 2010-6488

(51) Int. Cl.
| H04L 12/40 | (2006.01) |
| H04L 12/417 | (2006.01) |
| H04L 12/861 | (2013.01) |
| H04L 12/403 | (2006.01) |

(52) U.S. Cl.
CPC ............. *H04L 12/417* (2013.01); *H04L 49/90* (2013.01); *H04L 12/40182* (2013.01); *H04L 12/40013* (2013.01); *H04L 12/40143* (2013.01); *H04L 12/4035* (2013.01)

(58) Field of Classification Search
CPC .................. H04L 12/40013; H04L 12/40143; H04L 12/40182; H04L 12/4035; H04L 49/90
See application file for complete search history.

(56) References Cited

U.S. PATENT DOCUMENTS

| 4,760,275 | A | 7/1988 | Sato et al. | |
| 5,019,799 | A * | 5/1991 | Oshiage et al. | 340/438 |
| 5,282,199 | A * | 1/1994 | Herzberg et al. | 370/403 |
| 5,524,213 | A | 6/1996 | Dais et al. | |
| 2004/0252027 | A1 * | 12/2004 | Torkkola et al. | 340/576 |
| 2005/0038583 | A1 | 2/2005 | Fehr et al. | |
| 2008/0306647 | A1 * | 12/2008 | Jeon et al. | 701/29 |
| 2009/0300254 | A1 * | 12/2009 | Newald et al. | 710/305 |
| 2010/0293611 | A1 * | 11/2010 | Ablabutyan | 726/17 |

FOREIGN PATENT DOCUMENTS

| JP | 2007-312253 | 11/2007 |
| JP | 2008-005290 | 1/2008 |

OTHER PUBLICATIONS

European Search Report issued Mar. 31, 2011 in corresponding European Patent Application No. 10016045.6.
Leen, G. et al., "TTCAN: A New Time-Triggered Controller Area Network", Microprocessors and Microsystems, IPC Business Press Ltd., London, GB, vol. 26, No. 2, Mar. 17, 2002, pp. 77-94, XP004339936.

* cited by examiner

*Primary Examiner* — Andrew Chriss
*Assistant Examiner* — Salvador E Rivas
(74) *Attorney, Agent, or Firm* — Wenderoth, Lind & Ponack, L.L.P.

(57) ABSTRACT

A communication circuit, a relay connecting circuit, and a communication network transmit/receive contact signals usable for automatic control. A transmitting section transmits a contact signal input into an input/output section to a communication line, and a receiving section receives a signal via the communication line. An input/output circuit outputs the contact signal received by the receiving section via the input/output section and performs an interlocking function to prevent input of another contact signal via the input/output section. A time division communication control section switches a communication direction among the transmission section, the receiving section and the input/output circuit at a time-divided timing.

20 Claims, 6 Drawing Sheets

COMMUNICATION CIRCUIT, RELAY CONNECTING CIRCUIT, AND COMMUNICATION NETWORK

FIELD OF THE INVENTION

The present invention relates to a communication circuit, a relay connecting circuit, and a communication network. More specifically, the invention relates to the communication circuit, the relay connecting circuit, and the communication network that transmit contact signals to be used for automatic control according to bidirectional communication using a communication line so as to form a wire connecting state in a pseudo manner.

DESCRIPTION OF THE PRIOR ART

Devices to be controlled and control circuits are connected by using wires in transportation devices such as automobiles, electric trains, airplanes, ships and spaceships, and automatic control devices such as robots, manufacturing apparatuses and management apparatuses. As a result, the control circuits monitor the states of the devices and control the operations of the devices. A necessary number of wires is a number of states to be controlled and monitored between the control circuits and the devices, and thus constitutions become complicated and manufacturing costs rise accordingly.

Therefore, a method for holding data communication and various control using less number of wires as communication lines according to serial communication is devised and is put into practical use. Particularly in recent years, like a relay connecting unit and an electronic control unit disclosed in Japanese Patent Application Laid-Open No. 2008-5290 (Patent Document 1), signals are multiplexed by using communication control ICs such as in-vehicle LAN communication means for transmitting/receiving messages based on the communication standards such as CAN (Controller Area Network) and FlexRay (registered trade name of Daimler AG) in control system for in-vehicle control and mechanical control, so that a lot of devices are controlled by a less number of communication lines.

However, since conventional communication control ICs require a signal process for holding communication according to complicated protocols that enables the multiplexing of signals, constitutions become complicated accordingly, and further the signals are delayed. For this reason, the communication control ICs adopt communication using event triggers and thus a response speed is heightened when a number of events is small. As the number of events increases, a delay frequently occurs on communication wires due to collision. For this reason, in order to preferentially communicate more important messages, it is necessary that more complicated communication protocols are determined and the communication is held according to the protocols like the invention of Patent Document 1. As a result, it is inevitable that the communication control ICs become more complicated.

It is enough for the automatic control to transmit and receive contact signals that turn on/off devices to be controlled and ON/OFF contact signals representing the state of devices in most cases. However, complicated communication control ICs should be provided to both sides of communication lines, and further CPUs for operating the communication control ICs to control devices are required. Under adverse conditions such as automobiles where electric and magnetic noises are generated due to severe temperature changes and thumping vibrations, malfunctions of CPUs easily occur and thus reliability is deteriorated.

The present invention is devised in view of the above matters, and its object is to provide a communication circuit, a relay connecting circuit, and a communication network that have a very simple configuration and high reliability, and can transmit/receive contact signals usable for automatic control.

SUMMARY OF THE INVENTION

In order to solve the above problems, a first aspect provides a communication circuit, characterized by including a transmitting section for transmitting a contact signal input into an input/output section to a communication line, a receiving section for receiving a signal via the communication line, an input/output circuit for outputting the contact signal received by the receiving section via the input/output section and interlocking to prevent input of another contact signal via the input/output section that outputs a contact signal, and a time division communication control section for switching a communication direction among the transmission section, the receiving section and the input/output circuit at time-divided timing.

The transmitting section transmits a contact signal input into the input/output section at one end of the communication line to the communication line. On the other end of the communication line, the receiving section on the other end receives the contact signal transmitted via the communication wire, and the input/output circuit outputs the received contact signal via the input/output section. Since the time division communication control section switches the communication direction among the transmitting section, the receiving section and the input/output circuit at the time-divided timing, bidirectional communication can be held at the time-divided timing. Since the input/output circuit interlocks to prevent input of another contact signal via the input/output section that is outputting a contact signal, a contact signal cannot be input via the input/output section that is outputting the contact signal. For this reason, collision of contact signals on the communication line can be prevented.

Due to a combination of time division control of the communication direction in the time division communication control section and the interlock in the input/output circuit, even when different contact signals are simultaneously input from both ends of the communication line, only one of the contact signals input from any one end is selected so as to be capable of being transmitted to the other end of the communication line. As a result, collision of the contact signals in the communication wire can be securely prevented.

The communication line is preferably formed by a wire made of metal such as copper or silver with high electrical conductivity. It is more preferable that the communication line is a coaxial cable having a magnetic shield layer on its outside because an influence of noises is hardly exerted. Three or more signal lines are provided as the communication line, and the same contact signals are transmitted, and a majority selection is made from the signals received on a reception side so that an error of the contact signals due to disturbance can be eliminated. Logical signal lines including power line communication and wireless may be formed as the communication line.

A wire harness is formed by a connector containing the transmitting section, the receiving section, the input/output circuit, and an input/output terminal as one example of the input/output section. The wire harness, that is formed on the ends of the communication lines, can be replaced by an electric wire to be connected between conventional control circuit and device so as to be used, and can be easily incorporated into even an automatic control system without CPU. As a result, reliability can be heightened.

The contact signal to be input into the input/output section is preferably an ON/OFF signal obtaining by switching by means of an electromagnetic relay or a semiconductor. For example, when the input/output section is pulled up, a contact signal in ON state (active state that a signal is input) is at Low level, and a contact signal in OFF state (opened state that a signal is not input) is at High level. On the contrary, when the input/output section is pulled down, the contact signal in ON state is at High level, and the contact signal in OFF state is at Low level. In addition, when the input/output section is set to be an intermediate potential in the opened state, a contact input signal has three states where the contact signal in ON state can be contact-input at High/Low level and the input/output section has high impedance in OFF state.

The input/output section may be formed in a programmable logic device that is preferably a terminal of the wire harness. That is to say, the communication circuit of the present invention may be a functional block that is so-called an IP core described by hardware description language.

A second aspect provides a communication circuit, characterized by including a transmitting section for converting a plurality of contact signals input into a plurality of input/output sections into serial signals so as to transmit them to a communication line, a receiving section for parallel-converting the serial signals received via the communication line so as to make them as the plurality of received contact signals, an input/output circuit for outputting the plurality of contact signals received by the receiving section via the plurality of input/output sections and interlocking to prevent input of another contact signal via the input/output section outputting a contact signal, and a time division communication control section for switching a communication direction among the transmitting section, the receiving section and the input/output circuit at time-divided timing.

The transmitting section converts a plurality of contact signals input into the plurality of input/output sections at one end of the communication line into serial signals so as to transmit them to the communication line. The receiving section on the other side of the communication line converts the serial signals received via the communication line into parallel signals so as to generate a plurality of contact signals, and the input/output circuit outputs the plurality of contact signals via the input/output sections. That is to say, since the plurality of contact signals can be transmitting via the small number of communication lines, the communication lines can be reduced. As a result, the constitution becomes simple, and the manufacturing cost can be reduced.

The time division communication control section switches the communication direction among the transmitting section, the receiving section and the input/output circuit at time-divided timing, thereby enabling bidirectional communication. Further, since the input/output circuit interlocks to prevent the input of another contact signal via the input/output section outputting a contact signal, a contact signal cannot be input via the input/output signal outputting a contact signal. For this reason, the communication direction can be automatically changed in each input/output section, and the collision of the contact signals in the communication line can be prevented.

Particularly according to the combination of the time division control of the communication direction using the time division communication control section and the interlock using the input/output circuit, even when different contact signals are simultaneously input from both ends of the communication line, only a contact signal input from any one of the ends can be selectively transmitted to the other end of the communication line. As a result, the collision of contact signals in the communication wire can be securely prevented.

The communication line is preferably made of metal wire such as copper or silver with high electric conductivity. A coaxial cable having a magnetic shield layer on an outside of the wire is preferable because an influence of noises is hardly exerted. Further, three or more signal lines are provided as the communication line, and the same contact signals are transmitted, a majority selection is made from the signals received on the reception side. As a result, an error of the contact signals due to disturbance can be eliminated. It goes without saying that logical signal lines including power line communication and wireless may be formed as the communication line.

A wire harness is formed on the ends of the communication line by forming connectors containing the transmitting section, the receiving section, the input/output circuit, and input/output terminals as one example of the input/output sections. The wire harness can be replaced by a plurality of conventional electric wires (buses) that are bundled between a control circuit and a device to be connected, and can be used. The wire harness is easily incorporated into an automatic control system regardless of presence/non-presence of CPU, thereby simplifying the constitution and improving the reliability.

The contact signals to be input into the input/output sections are preferably ON/OFF signals obtained by switching by means of an electromagnetic relay or a semiconductor. For example, when the input/output section is pulled up, a contact signal in ON state (active state that a signal is input) is at Low level, and a contact signal in OFF state (opened state that a signal is not input) is at High level. On the contrary, when the input/output section is pulled down, the contact signal in ON state is at High level, and the contact signal in OFF state is at Low level. In addition, when the input/output section is set to be an intermediate potential in the opened state, a contact input signal has three states where the contact input signal in ON state can be contact-input at High/Low level and the input/output section has high impedance (floating level) in OFF state.

Further, the input/output section may be formed in a programmable logic device. That is to say, the communication circuit of the present invention may be a functional block that is so-called an IP core described by hardware description language.

The time division communication control section has a token control section for holding communication according to a token passing system. In this case, the token control section securely get into temporal synchronization according to token and simultaneously communicates the contacts signals. For this reason, unlike the case where communication is held by event trigger, collision does not occur and a response is not delayed according to an amount of messages. When the synchronous communication is held and thus different signals are simultaneously input from both the ends of the communication line, any of the input/output section is selected in an order of obtained use rights of the communication line according to the tokens, and contact information is input so that an ON signal can be transmitted. As a result, the collision of signals does not occur in the communication line.

When a master station that issues a token call is not present in the communication line, the token control section actively issues a token call so as to enable the communication cable to perform a degenerating operation also at the time of disconnecting the communication cable.

The communication line has a wiring branching section that is branched and connected, a storage section for storing contact signals received from terminals of the communication lines branched and connected, and a logical sum operating section for obtaining a logical sum of the contact signal at the terminals of the communication lines stored in the storage section as a received contact signal are provided. In this case, the contact signal input into one terminal of the input/output sections provided to the ends branched by the wiring branching section is output to the input/output section provided to the other end. That is to say, the communication lines virtually form bus lines (hereinafter, virtual bus lines), so that a so-called remote bus is formed between separated two points.

This communication circuit has the storage section for temporarily storing reception signals received by the receiving section, the logical sum operating section for operating a logical sum of ON signals of the reception signals stored in the storage section, and a switching circuit for preventing input of a contact signal via the input/output section outputting the ON signal using the logical sum obtained by the logical sum operating section. For this reason, when the ON signal is input into any one of the input/output section belonging to the same virtual bus line, the input/output circuit securely provides interlock to prevent input of a contact signal via the input/output section. As a result, a damage accident caused by collision of different signals can be prevented. The interlock and token by means of the storage section and the logical sum operating section are monitored, and when an ON signal is not input from a next node at a self station until a node at the self station is again issued a call, a contact signal from the self station can be transmitted, and input of the other contact signals can be prevented.

A third aspect provides a relay connecting circuit, characterized by including at least one set of a transmitting section, a receiving section and a time division communication control section that is connected to at least one communication line connected to the communication circuit and has the same constitution as the set of the communication circuit as many as the signal line, a plurality of internal contact output sections for outputting contact signals received by the receiving section, a plurality of internal contact input sections for inputting contact signals to be transmitted to the communication line via the transmitting section, and a grid-shaped wire connecting circuit for arbitrarily connecting the internal contact output sections and the internal contact input sections.

The contact signals input into the internal contact input sections of the relay connecting circuit having the above configuration are transmitted via the transmitting section and can be output to input/output section at the separated other end. In addition, since the grid-shaped wire connecting circuit is provided between the internal contact output sections and the internal contact input sections, any two points can be connected, so that only necessary signals can be relayed. A wire connecting state in the grid-shaped wire connecting circuit can be easily changed.

A relay input/output section that is connected directly to the grid-shaped wire connecting circuit and relays signals is provided. In this case, the relay input/output section intervenes so as to be capable of connecting a monitor device for maintenance, for example.

A fourth aspect provides a communication network formed by connecting a plurality of communication lines into a mesh shape via the relay connecting circuit, characterized in that the grid-shaped wire connecting circuit is formed by a programmable logic device, the internal contact output sections have a writing port for writing wire connection information, the receiving section has a reliability monitoring circuit for counting how many times defective communication occurs and/or how many times proper reception cannot be carried out so as to obtain reliability of the communication lines, and a wire connection adjusting section for adjusting wire connecting states by means of the grid-shaped wire connecting circuits so that a communication line with low reliability is bypassed on a position communicable to the reliability monitoring circuit and the writing port is provided.

In the above constitution, the communication network is formed by connecting a plurality of communication wires into a mesh shape, so that a contact signal input into one input/output section on the communication network can be transmitted via the plurality of communication wires and can be output to the input/output section provided to another communication cable connected by the grid-shaped wire connecting circuit. Since the grid-shaped wire connecting circuit is formed by a programmable logic device such as FPGA, the wire connection adjusting section can dynamically adjust the wire connecting state. Since the majority receiving circuit has the reliability monitoring circuit, when a determination is made that the communication cable has low reliability due to various noises and deteriorations, the wire connecting state of the grid-shaped wire connecting circuit can be changed so that this communication cable is not used. That is to say, the reliability is improved.

It is more preferable that the time division control sections connected to the communication lines, respectively, positively issue token calls, so that degeneration communication at the time of disconnection of the communication lines is held. The communication network that holds communication of higher reliability is suitable for wiring on a portion requiring high reliability in electronic control apparatuses incorporated into transportation means such as automobiles, airplanes, ships and rockets, and devices such as a robot.

When the communication cable is the wire harness, the connecting apparatus is a repeater of the wire harness. Further, when the relay input/output sections are provided so as to be capable of connecting three or more communication cables to one connecting apparatus, the connecting apparatus is a branching connection apparatus of the communication cables.

The communication circuits from the first to second aspects can transmit/receive ON/OFF contact signals bidirectionally according to the time division communication using a less number of communication lines. For this reason, the input/output sections of the communication circuits arranged at separated two points can be virtually connected by a bus line, namely, a so-called virtual bus line can be formed. As a result, the electronic control apparatus and the device to be controlled can be simply connected without using CPU that is comparatively expensive and causes malfunctions and delays of processes in conventional techniques. Further, since the collision of signals in the communication lines can be securely prevented, safety is secured, and since a delay due to the collision does not occur, the automatic control can be securely made.

The relay connecting apparatus from the third aspect connects the communication cables such as the wire harnesses formed by the communication circuits so as to relay them, and can branch the three or more cables so as to connect them.

Since the communication network from the fourth aspect can easily connect the wire harnesses into a mesh pattern, two or more communication routes are secured so that the reliability can be improved. Further, even in the case of complicated connection, a connecting state can be set by software. For this reason, the wiring becomes simple, and accordingly the communication network look good and its reliability is high. The communication network can flexibly cope with changes in devices for communication at the time of maintenances such as an increase and replacement of devices to be controlled.

DETAILED DESCRIPTION OF THE INVENTION

Preferred embodiments of the present invention are described below with reference to the accompanying drawings.

Figure 1:
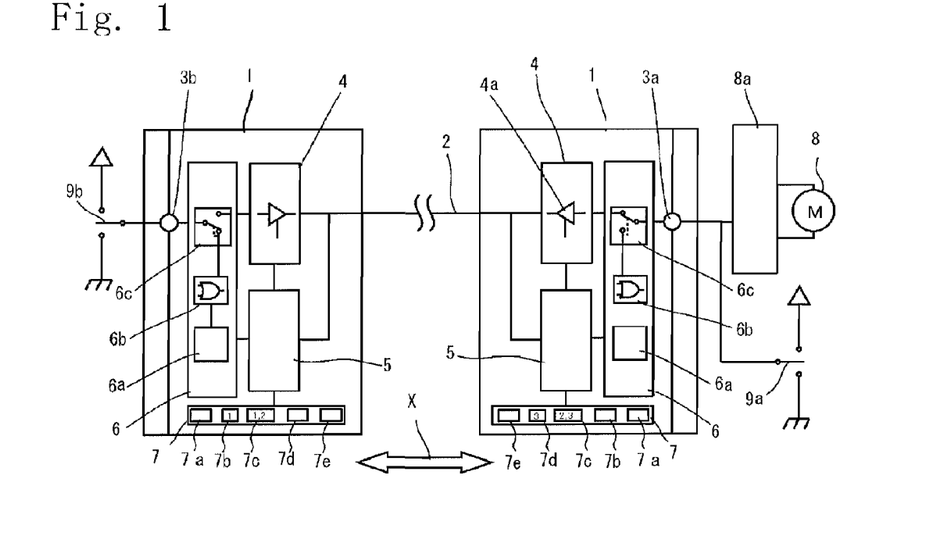
FIG. 1 is a diagram illustrating a configuration of a communication circuit according to a first embodiment of the present invention.
Figure 2:
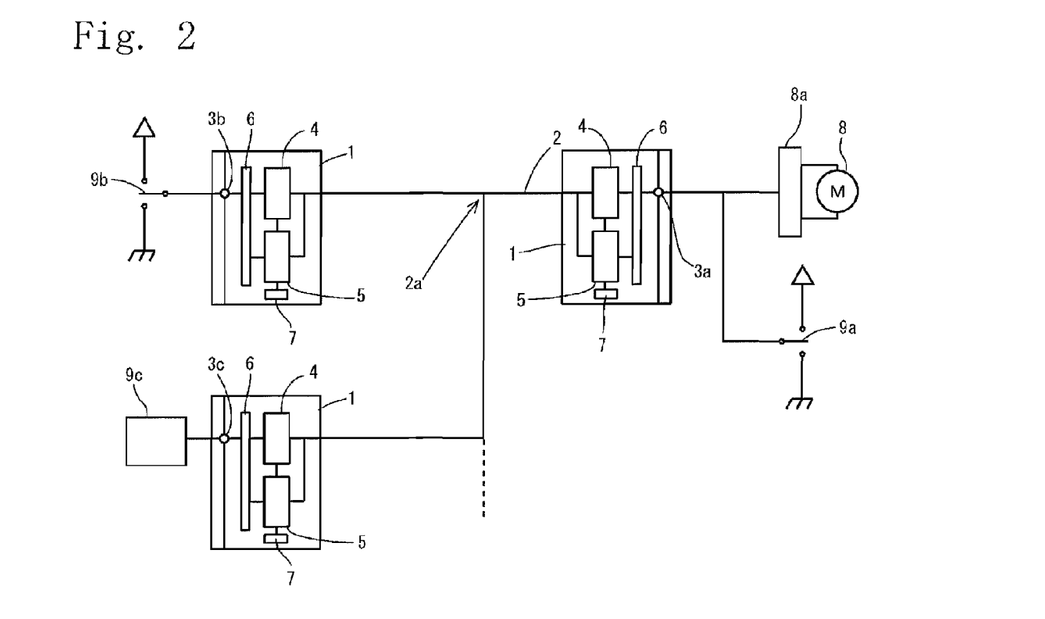
FIG. 2 is a diagram illustrating one example a communication cable using the communication circuit shown in FIG. 1.

FIGS. 1 and 2 are diagrams describing a configuration of a communication circuit 1 according to a first embodiment of the present invention.

As shown in FIGS. 1 and 2, the communication circuit 1 according to the first embodiment is connected to the communication circuit 1 arranged on a separate position by a communication line 2 so that a virtual bus line is formed therebetween. The communication circuit 1 has a transmitting section 4, a receiving section 5, an input/output circuit 6, and a time division communication control section 7. The transmitting section 4 transmits a signal input into an input/output section 3a (3b) to the communication line 2. The receiving section 5 receives the signal via the communication line 2. The input/output circuit 6 outputs a contact signal received by the receiving section 5 via the input/output section 3b (3a) and interlocks to prevent input of another contact signal via the input/output section 3b (3a) outputting the contact signal. The time division communication control section 7 switches a communication direction among the transmitting section 4, the receiving section 5 and the input/output section 6 at time-divided timing.

As shown in FIG. 2, the communication circuits 1 according to the first embodiment can be arranged on separated positions with them being connected by the communication line 2. A virtual bus line is formed so that the input/output sections 3a, 3b, 3c, . . . of each communication circuit 1 connected by the communication line 2 branched at a wiring branching section 2a are, so to speak, connected by the bus line. The virtual bus line can connect a device 8 (in this example, a motor for opening/closing powered windows of an automobile), a handy operation switch 9a, a remote operation switch 9b, and an electronic control device 9c such as ECU to be controlled. That is to say, the communication circuit 1 is formed in each harness connector of the communication cable (wire harness) to be used for wiring in the automobile, for example. The device 8 to be controlled, the operation switches 9a and 9b and the electronic control device 9c have the connector connectable to the wire harness, so as to be easily detachable. A motor driver 8a drives the motor 8.

The communication line 2 is a coaxial cable having a magnetic shield (not shown) made of a mesh-shaped conductor, and the magnetic shield is connected to ground of the transmitting section 4 and the receiving section 5, so that an influence of electric and magnetic noises can be hardly exerted. However, the communication line 2 of the present invention is not limited to the coaxial cable. The communication circuit 1 of the present invention may use three or more communication lines so that reliability is improved. In this case, the transmitting section 4 has a circuit for branching one signal according to the number of the communication lines 2, and the receiving section 5 has a majority selecting circuit for comparing signals received via the plurality of communication lines 2 so as to use the signals which are most matched with one another as true.

The input/output sections 3a, 3b . . . form connecting terminals of the connectors, and formed by plugs or receptacles, and for easy description in the first embodiment, one input/output section 3a is provided to one connector.

The transmitting section 4 transmits a node number of the self station and selectively a signal to the communication line 2 at synchronous timing determined by the time division control section 7. The transmitting section 4 is arranged on a portion where a signal is transmitted to the communication line 2, and has a buffer 4a for amplifying an electric current of a signal. Further, in the first embodiment, since contact signals to be input into the input/output sections 3a and 3b are at High level or Low level in ON state, and the contact signals are of high impedance in OFF level, the buffer 4a of the transmitting section 4 is a three-state buffer accordingly. A voltage level of the three-state buffer 4a at the time of high impedance is set to an intermediate voltage level (hereinafter, Mid level) between High level and Low level.

The first embodiment describes an example where the contact signals are at High level or Low level in ON state, and the three-state buffer is adopted so that the voltage level representing contact information is at High level, Low level and Mid level. However, instead of this example, when first bit information representing the ON state/OFF state and second bit information representing a voltage level in ON state are separately transmitted as the contact information, the three-state buffer does not have to be used as the buffer 4a. When the contact signal is at Low level (or High level) in ON state and at High level (or Low level) in OFF state is treated, the three-state buffer does not have to be used as the buffer 4a.

The receiving section 5 is a circuit that, when a signal with a node number received by the self station in the signals transmitted by the respective nodes at the synchronous timing determined by the tie division control section 7 is transmitted to the communication line 2, receives the signal via the communication line 2.

The input/output circuit 6 has a storage section 6a, a logical sum operating section 6b and a switch element 6c. The storage section 6a stores contact signals received by the receiving section 5 for one or more token cycle. The logical sum operating section 6b obtains a use state of the communication line 2 based on a logical sum of the contact signals in ON state stored in the storage section 6a. The switch element 6c can connect the input/output section 3a (3b) . . . to the transmitting section 4 only when the contact signal in ON state is not transmitted on the same virtual bus line by the logical sum operating section 6b (when contact signals in ON state are not output from all the nodes). As a result, the input/output circuit 6 has an interlock function. It is considered that the storage section 6a stores contact signals in ON state received from the respective nodes belonging to the same virtual bus line, and the logical sum operating section 6b obtains a logical sum of the stored contact signals. However, the storage section 6a and the logical sum operating section 6b may be united into one, a logical sum operation may be sequentially performed on the contact signals in ON state received by the receiving section 5 according to the synchronous timing and simultaneously results of the logical sum operation performed by the logical sum operating section 6b maybe stored into the storage section 6a.

The time division control section 7 holds synchronous communication according to a token passing system. The time division control section 7 has a token call control section 7a, an SS (Sending Slot) storage section 7b, an RS (Receiving Slot) storage section 7c, a signal transmission control section 7d, and a signal reception control section 7e. The token call control section 7a has an arbitration function for actively generating a token signal. The SS storage section 7b records a node number of the self station. The RS storage section 7c records a node number of a reception station. The signal transmission control section 7d outputs a signal to the transmitting section 4 according to the synchronous timing at which the node at the self station recorded in the SS storage section 7b is allocated by the token signal. The signal reception control section 7e allows the receiving section 5 to receive a signal from the node at another station stored in the RS storage section 7c. Therefore, bidirectional communication can be held in the communication circuit 1 as shown by an arrow X in FIG. 1.

An operation of a communication cable using the communication circuit 1 is described with reference to FIG. 3. It is supposed that addresses "1", "2" and "3" are set in the SS storage sections 7b of the nodes (the input/output sections 3a, 3b and 3c) to which the motor 8 and the handy operation switch 9a, the remote operation switch 9b, and the electronic control device 9c are connected. At this time, addresses "2, 3", "1, 3" and "1, 2" of another nodes are set in the RS storage sections 7c.

When predetermined time passes with a token call not being issued, the token call control section 7a of each node actively issues a token. However, for example, when the token call timing is shifted according to information stored in each of the SS storage section 7b, the token call control section 7a at the node (input/output section 3a) with SS number "1" whose priority is the highest is selected as a bus master so as to issue tokens T1 to T3 and determine the entire synchronous timing. In the first embodiment, since the three nodes are present in the communication circuit 1, the token call control section 7a issues the tokens T1 to T3 whose number is in accordance with that number at each predetermined time T.

Each of the nodes transmits the node numbers "#1" to "#3" of the self station and a signal input into the input/output section 3a to the communication line 2 at the synchronous timing given to the self station. When no signal is input into the input/output section, a Mid level (OFF state) is transmitted. Waveforms S1 to S3 shown in FIG. 3 represent signals to be transmitted to the communication line 2 by the transmitting sections 4 of the input/output sections 3a to 3c, one example is described with reference to a solid line, and a fluctuation range of the signals is shown by a dotted line. SWa represents an input signal from the handy operation switch 9a or a signal to be output from the input/output section 3a to the motor driver 8a, and SWb represents an input signal from the remote operation switch 9b or a signal to be output from the input/output section 3b.

The signal from the handy operation switch 9a is input directly into the motor driver 8a without via the communication circuit 1, and when the input voltage level is High, the motor 8 rotates to a regular direction, and when Low level, the motor rotates to a reverse direction. That is to say, the motor 8 is rotated to the regular and reverse directions by the handy operation switch 9a, so that, for example, windows of an automobile can be opened or closed.

Figure 3:
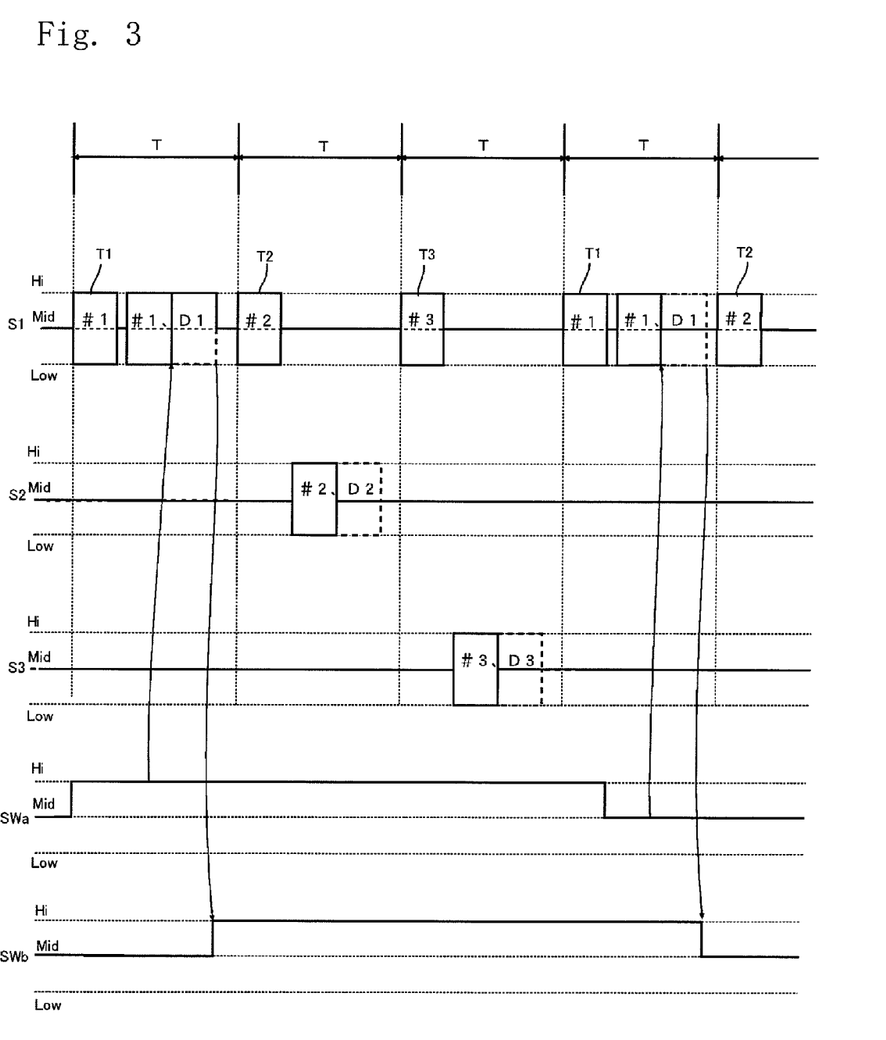
FIG. 3 is a diagram describing a communication method in the communication circuit.

When the first token T1 is issued in FIG. 3, the handy operation switch 9a is operated and High level is input. In this case, after the transmitting section 4 of the communication circuit 1 connected to the handy operation switch 9a transmits the node number "#1" at the self station, it transmits High level to the communication line 2 according to the input signal. The receiving section 5 in the communication circuit 1 on the side of the remote operation switch 9b receives this signal so as to output it to the input/output section 3b.

At the same time, reception of the signal at High level (ON state) from the node number "1" is stored in the storage sections 6a provided to the input/output circuit 6 of node numbers "2" and "3". The received voltage signal at High level is output to the input/output sections 3b and 3c, and the logical sum operating section 6b detects that an ON signal from any node is input into the storage section 6a. As a result, the switch circuit 6c is switched so as to interlock for preventing signal input from the input/output sections 3b and 3c.

That is to say, in a state that the switch circuit 6c is switched, the contact input signal input into the input/output section 3a with node number "1" is output directly to the input/output sections 3b and 3c with node numbers "2" and "3", and thus the input/output sections 3a to 3c are connected directly by the bus line in a pseudo manner. The communication of the contact input signal can be held bidirectionally as shown by the bidirectional arrow X in FIG. 1, but the interlock is set by the input/output circuit 6. As a result, even when different inputs are performed at both the ends of the communication circuit 1, collision of signals never occur. This is an effect that can be obtained because the communication circuit 1 holds the synchronous communication.

That is to say, since the interlock is not released until the contact input signal to the input/output section 3a with node number "1" is brought into OFF state at next synchronous cycle. For this reason, a problem such that the communication wire 2 (communication cable) is damaged by the collision of signals can be avoided.

In an example shown in FIG. 3, since the handy operation switch 9a turn to be in OFF state by second synchronous timing comes at the node with node number "1", the transmission signal from the transmitting section 4 with node number "1" is at Mid level (floating state) in OFF state. When the storage section 6a is cleared, the interlock is released so that the contact signals from all the input/output sections 3a to 3c can be input.

The first embodiment describes the case using the three-state buffer, and the example where in the signal to be transmitted to the communication line 2, two voltages in ON state (High level and Low level) and an intermediate voltage in OFF state (floating state, and Mid level in this specification) are generated. However, the present invention is not limited to these examples. That is to say, a signal for identifying a binary value of 2 bits, namely, a signal for identifying the two ON states (High level or Low level), and a signal for identifying ON state or OFF state may be separately transmitted to the communication lines 2a to 2c. Further, as the buffer to be used for the signal transmission, an open-collector type buffer is used in order to close to characteristics of a common bus. It goes without saying that such various modification can be considered. Further, instead of the physical communication line 2, power line communication or wireless communication may be used as a virtual communication line.

Figure 4:
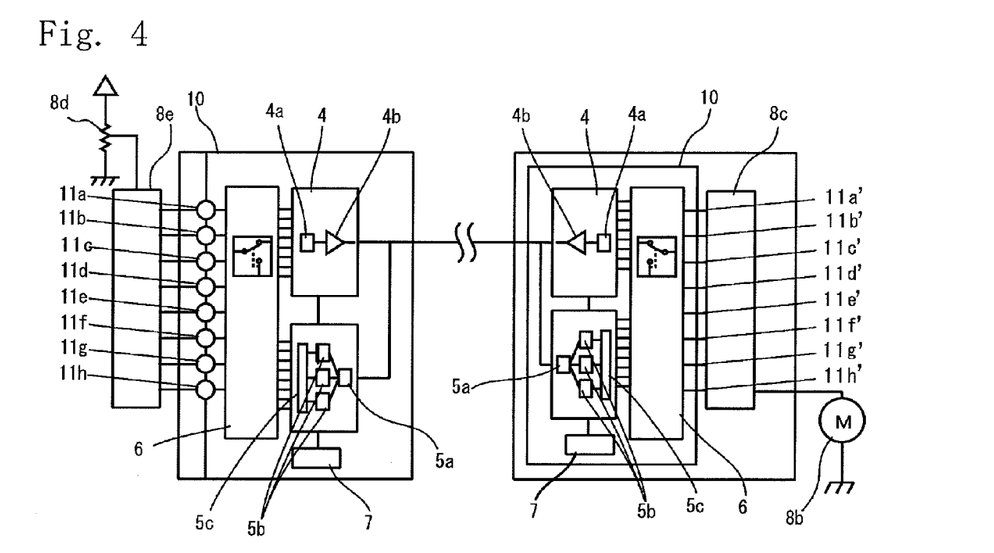
FIG. 4 is a diagram illustrating configurations of the communication circuit and a relay connecting circuit according to a second embodiment.
Figure 5:
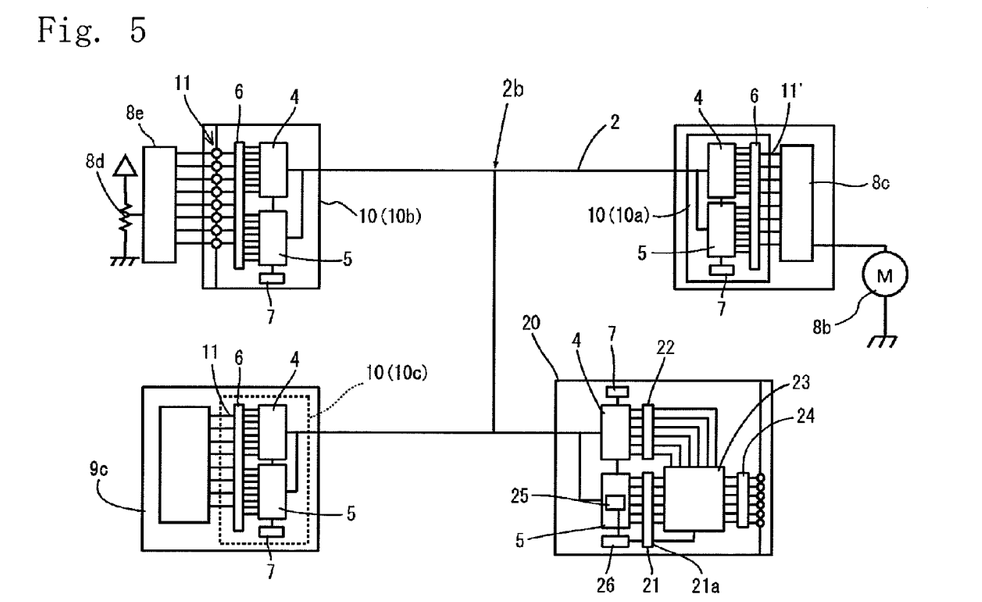
FIG. 5 is a diagram illustrating an example of the communication cable using the communication circuit and the relay communicating circuit.

FIGS. 4 and 5 are diagrams describing configurations of the communication circuit 10 and the relay connecting circuit 20 according to a second embodiment. In these drawings, the members designated by the same reference symbols as those in the first embodiment shown in FIGS. 1 to 3 are the same as or equivalent to the components in the first embodiment. For this reason, detailed description about them is omitted, and thus overlapped description is avoided. The respective communication circuits 10 are discriminated by using reference symbols 10a to 10c, and thus are described as the communication circuits 10a to 10c.

As shown in FIGS. 4 and 5, the communication circuits 10a to 10c according to the second embodiment are connected to the terminals of the communication line 2 so as to form a communication cable. The communication circuits 10a to 10c have the transmitting section 4, the receiving section 5, the input/output circuit 6, and the time division communication control section 7. The transmitting section 4 converts a plurality of contact signals input into a plurality of input/output sections 11 into serial signals and transmits them to the communication line 2. The receiving section 5 parallel-converts the serial signals received via the communication line 2 so as to use them as the plurality of received contact signals. The input/output circuit 6 outputs the plurality of contact signals received by the receiving section 5 via the plurality of input/output sections 11 and interlocks to prevent input of another contact signal via the input/output section 11 outputting the contact signal. The time division communication control section 7 switches a communication direction among the transmitting section, the receiving section and the input/output circuit at time-divided timing.

A DC motor 8b is to be controlled, a driving circuit 8c contains a DA converter for applying a multistep driving voltage to the DC motor 8b. An input sensor 8d is formed by a potentiometer or the like, and an AD converter 8e digitally converts an analog output from the input sensor 8d. The communication circuit 10a according to the second embodiment is formed in a programmable logic device connected to the driving circuit 8c of the DC motor 8b, and the communication circuit 10b is formed in a harness connector connected to the communication line 2. The communication circuit 10c is incorporated as a function block into a programmable logic device composing ECU 9c for driving the DC motor 8b using a value measured by the input sensor 8d.

A relay connecting circuit 20 is connected to one end of the communication line 2 connected to the communication circuits 10a to 10c. The relay connecting circuit 20 has one set of the transmitting section 4, the receiving section 5 and the time division communication control section 7 having the same constitutions as those in the communication circuit 1. The relay connecting circuit 20 has a plurality of internal contact output sections 21, a plurality of internal contact input sections 22, and a grid-shaped wire connecting circuit 23. The internal contact output sections 21 output the contact signals received by the receiving section 5. The internal contact input sections 22 input the contact signals to be transmitted to the communication line 2 via the transmitting section. The grid-shaped wire connecting circuit 23 arbitrarily connects the internal contact output sections 21 and the internal contact input sections 22. Further, the relay connecting circuit 20 according to the second embodiment has a relay input/output section 24 that is connected to the grid-shaped wire connecting circuit 23 and is connected directly to another communication cable such as a wire harness so as to relay signals. The internal contact output sections 21 have a writing port 21a for adjusting the grid-shaped wire connecting circuit 23.

The communication circuits 10a to 10c and the relay connecting circuit 20 may be formed by combining some electronic devices, or may be integrated into IC as a single body, or may be a function block formed into IC such as an electronic control device.

The communication line 2 according to the second embodiment is branched and connected by the wiring branching section 2b and thus has four terminals. The communication circuits 10a to 10c and the relay connecting circuit 20 are provided to the terminals, respectively, so as to compose the wire harness that virtually forms the virtual bus line comprising eight flat cables between the internal contact output sections 11 of the communication circuits 10a to 10c, and the internal contact output sections 21 and the internal contact input sections 22 of the relay connecting circuit 20. A branching number of the communication line 2 is determined by numbers of the electronic control devices 9c for outputting control signals for controlling the DC motor 8b and input sensors 8a, and for easy description in the second embodiment, the communication line 2 has four terminals. It goes without saying that the branching number can be freely adjusted as the need arises.

In the second embodiment, each of the transmitting sections 4 has a serial converting circuit 4a for converting parallel contact signals input into the eight input/output sections 11 into serial signals, and a buffer 4b. Each of the receiving sections 5 has a parallel converting circuit 5a, a storage section 5b and a logical sum operating section 5c. The parallel converting circuit 5a converts serial signals received via the communication lines 2 into parallel contact signals capable of being output to the input/output sections 11. The storage section 5b stores the parallel-converted contact signals for each node arranged on the same virtual bus line. The logical sum operating section 5c calculates a logical sum of contact information about the ON state stored in the storage section 5b. That is to say, in the second embodiment, the storage section 5b and the logical sum operating section 5c are provided into the receiving section 5.

On the other hand, the input/output circuit 6 is a switch element that outputs the contact signals from the logical sum operating section 5c via the input/output sections 11, and simultaneously interlocks to prevent input of signals via the input/output sections 11 to the transmitting section 4 when the contact signals from the receiving section 5 are input via the input/output sections 11.

The input/output sections 11 in the second embodiment are input/output ports 11a' to 11h' of the integrated circuit-compatible communication circuit 10a, connecting terminals 11a to 11h formed by plugs or receptacles of the harness connector containing the communication circuit 10b, and input/output ports 11a' to 11h' of the function block composing the communication circuit 10c.

The grid-shaped wire connecting circuit 23 is preferably formed by, for example, a programmable logic device, and its contents are constituted so as to be dynamically changed by a signal from the writing port 21a. The receiving section 5 of the relay connecting circuit 20 preferably has a reliability monitoring circuit 25 and a wire connection adjusting section 26. The reliability monitoring circuit 25 counts how many times defective communication occurs and/or how many times which proper reception cannot be performed, so as to check a wiring condition using a communication error incidence and the like for obtaining the reliability of the communication line 2. The wire connection adjusting section 26 adjusts the wire connecting state according to the state of the communication line 2 monitored by the reliability monitoring circuit 25. Further, the relay input/output section 24 is connected to a connecting terminal formed by a plug or receptacle of the harness connector for enabling connection to a connector of another wire harness.

Although the communication circuits 10a to 10c have the simple configuration such that they are connected by one communication line 2, they can transmit/receive parallel signal for one word of 8 bits to any direction according to the serial communication. For this reason, contact signals for 8 bits to be output from the ECU 9c can be received by the DA converter 8c, so that torque control of the DC motor 8b can be made in an analog manner (in this example, 256-stage control).

In another manner, contact information that is measured by the potentiometer 8d and is converted into parallel contact signals of 8 bits by the AD converter 8e is received by the ECU 9c, so that automatic control with higher accuracy can be made. An input/output port 11' with width of 16 bits (for 2 words) is provided to the side of the ECU 9c, so that the ECU 9c can control the DC motor 8b and monitor a position by the potentiometer 8d. In addition, the second embodiment describes the example where contact signals of all bits in one word are transmitted/received to the same direction, but the communication circuits 10a to 10c of the present invention can flexibly switch the transmission direction of the contact information for each bit.

When information about the grid-shaped wire connecting circuit 23 for arbitrarily connecting between the internal contact output sections 21 and the internal contact input sections 22 is rewritten, the connecting states of the input/output sections 11 and 11' of the communication circuits 10a to 10c can be changed. That is to say, since the connection of the virtual bus line can be adjusted as software, only the connecting state can be changed without rewiring the wired wire harness. Further, the reliability monitoring circuit 25 always monitors the reliability of the communication line 2, and the wire connection adjusting section 26 automatically adjusts the connecting state so that the communication with high reliability can be realized.

Various external communication devices can be connected via the relay input/output section 24. For example, a maintenance check monitor device can be connected.

Figure 6:
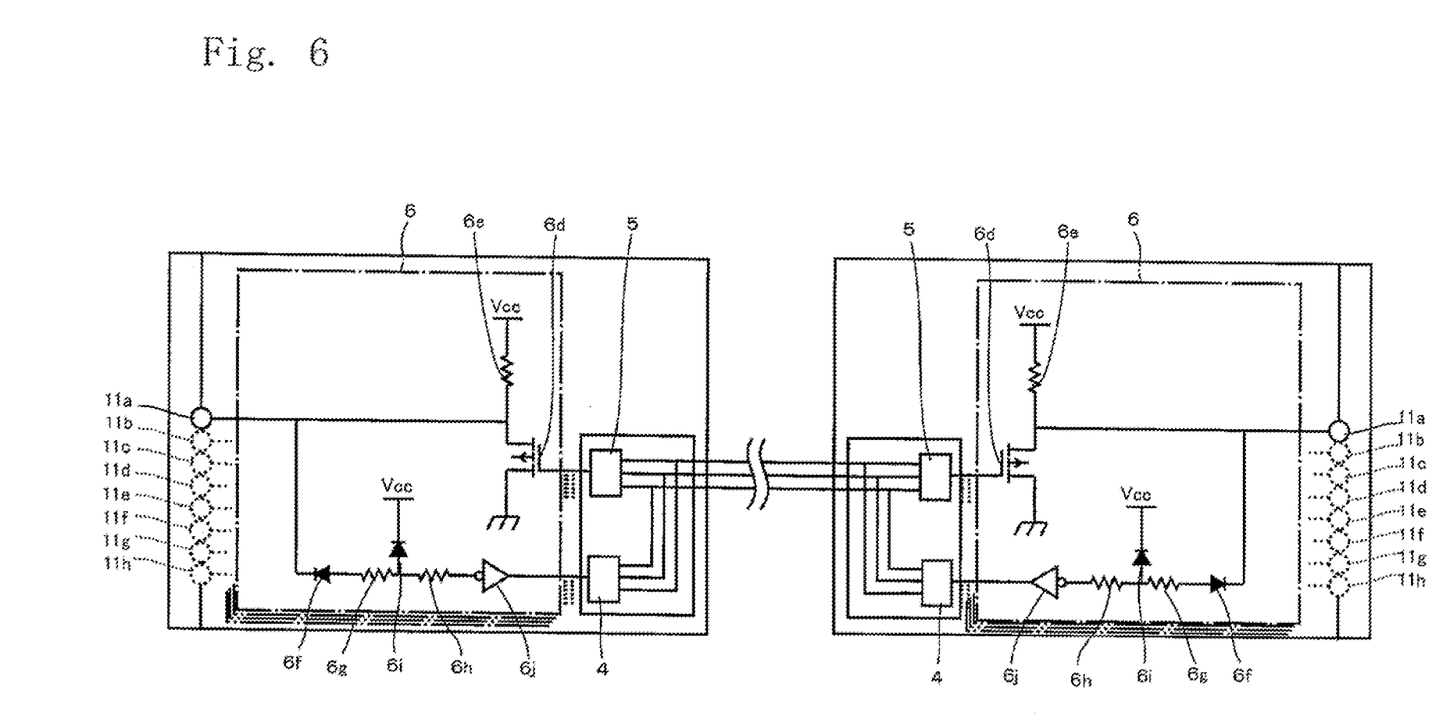
FIG. 6 is a diagram illustrating a concrete constitution of a detailed portion of the communication cable.

FIG. 6 is a diagram illustrating one example of the input/output circuit 6 using the switch element. In FIG. 6, a switching element 6d such as FET is connected to the receiving section 5, and a pull-up resistor 6e is connected between the switching element 6d and a power supply Vcc. A diode 6f is connected to the switching element 6d, the resistor 6e and the input/output section 11a, and resistors 6g and 6h are connected to the diode 6f in series. A diode 6i is connected between both the resistors 6g and 6h and the power source Vcc, and a logical inverting circuit 6j is connected to the resistor 6h.

The circuit formed by a series of the elements 6d and 6j inverts a signal received by the receiving section 5 so as to output it via the input/output section 11a, and when the receiving section 5 is in ON state (High level), a Low level is output via the input/output section 11a, and interlocks to prevent input of a signal via the input/output section 11a. That is to say, only when the output signal from the receiving section 5 is in OFF state (Low level), a voltage of the input terminal of the logical inverting circuit 6j changes according to a voltage level of the input/output section 11a, so that the inverted signal is input into the transmitting section 4. With the provision of the input/output circuit 6, the communication cable can hold the bidirectional communication according to input signals to the input/output sections 11a to 11h.

As the input/output circuit 6, a circuit in which elements such as diodes and transistors for performing simple operations are simply combined is configured, and a complicated control circuit such as CPU is eliminated. As a result, manufacturing cost can be reduced and also occurrence of erroneous operations can be prevented more securely.

Interlocking by the series of the elements 6d to 6j which are connected to the input/output sections 11a to 11h are performed about the ON/OFF contact signal of each bit received by receiving section 5 (not shown). FIG. 6 illustrates only the main portion for describing in detail the circuit configuration of the portion where interlock is set for the input signals. For this reason, it goes without saying that the description about various detailed members included in the communication circuits 10a to 10c is omitted.

Figure 7:
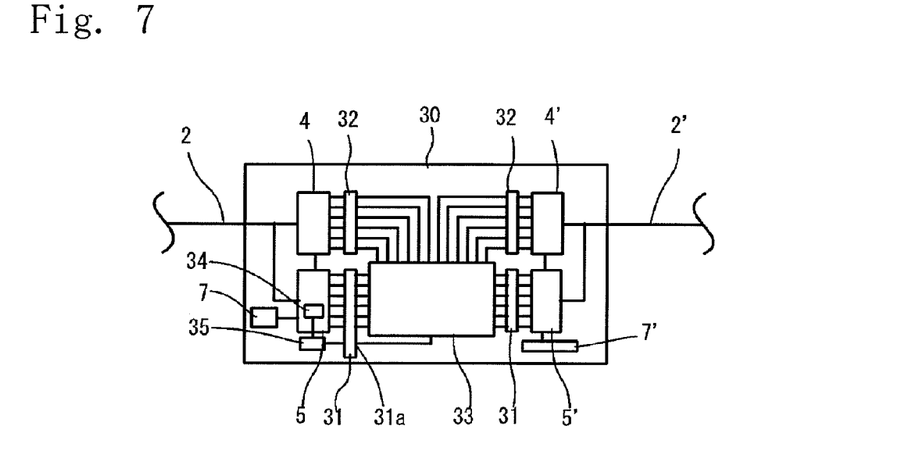
FIG. 7 is a diagram illustrating a configuration of the relay connecting circuit according to a third embodiment.

FIG. 7 illustrates a configuration of a relay connecting circuit 30 to be connected to at least two communication lines 2 and 2' connected to the communication circuits 10a to 10c. The relay connecting circuit 30 has at least one set of transmitting sections 4 and 4', receiving sections 5 and 5' and time division communication control sections 7 and 7' having the same constitutions as those in the communicating circuits 10a to 10c according to the communication lines 2 and 2'. The relay connecting circuit 30 has a plurality of internal contact output sections 31, a plurality of internal contact input sections 32, and a grid-shaped wire connecting circuit 33. The internal contact output sections 31 output contact signals received by the receiving sections 5 and 5'. The internal contact input sections 32 input contact signals transmitted to the communication lines via the transmitting sections. The grid-shaped wire connecting circuit 33 arbitrarily connects the internal contact output sections and the internal contact input sections. The receiving sections 5 and 5' have a reliability monitoring circuit 34, and a wire connection adjusting section 35 for adjusting a wire connecting state of the grid-shaped wire connecting circuit 33 by means of writing from a writing port 31a based on a monitored result of the reliability monitoring circuit 34.

The internal contact output sections 31, the internal contact input sections 32, the grid-shaped wire connecting circuit 33, the reliability monitoring circuit 34 and the wire connection adjusting section 35 have the approximately same constitutions as those of the internal contact output sections 21, the internal contact input sections 22, the grid-shaped wire connecting circuit 23, the reliability monitoring circuit 25 and the wire connection adjusting section 26 detailed before. For this reason, detailed description thereof is omitted. The relay connecting circuit 30 according to the second embodiment is preferably made to be IC by a programmable logic device, and as the numbers of the internal contact output sections 31 and the internal contact input sections 32 are larger, the number of contact signals capable of being relayed can be increased.

In order to simplify the drawing in the example of FIG. 7, the transmitting sections 4 and 4', the receiving sections 5 and 5' and the time division communication control sections 7 and 7' are provided in two directions, but the providing number and the direction of them can be arbitrarily set. The communication lines 2 and 2' are provided to 3 or four or more directions, so as to be capable of being branched and connected. Since the relay connecting circuit 30 having the configuration in the second embodiment is connected to the communication wires 2 and 2', the number of wires to be connected to the relay connecting circuit 30 is reduced, and thus accordingly the configuration can be simplified.

Figure 8:
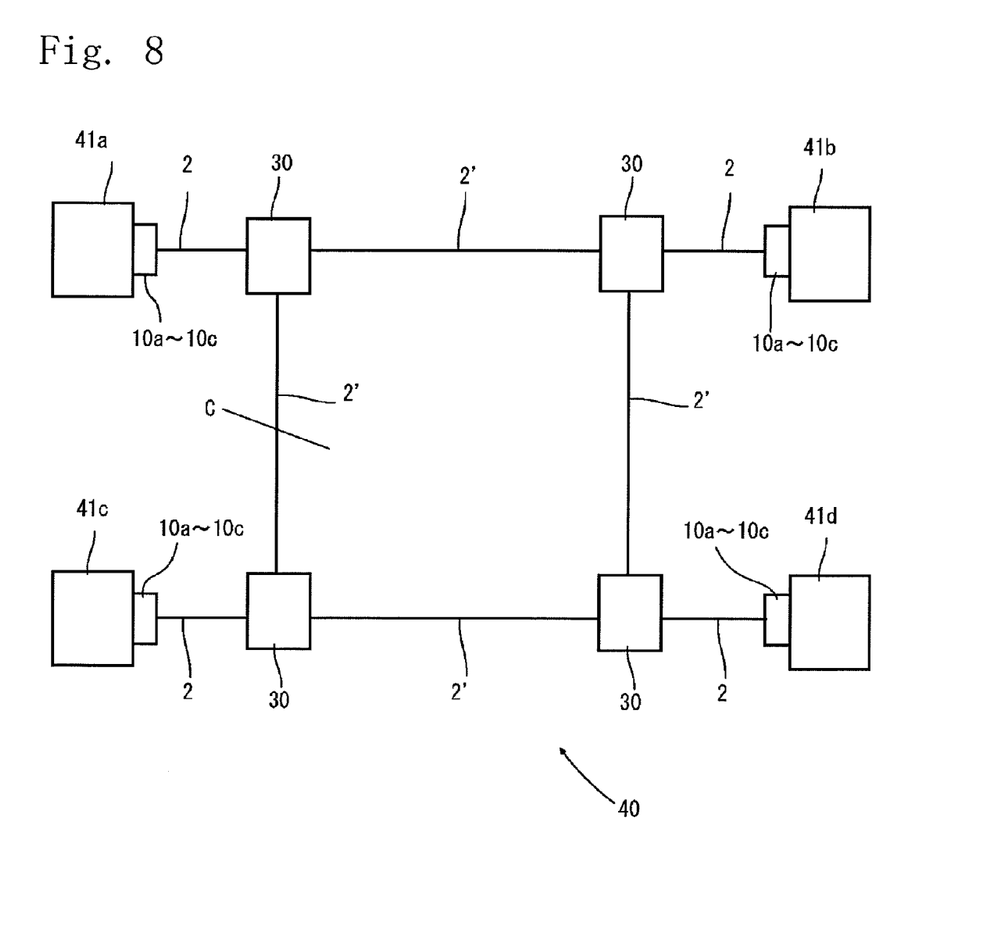
FIG. 8 is a diagram illustrating one example of a communication network using the relay connecting circuit.

FIG. 8 is a diagram illustrating one example of a communication network 40 formed by using the relay connecting circuit 30. As shown in FIG. 8, the communication network 40 according to the second embodiment is an example where the communication wire 2 to be connected to any of the communication circuits 10a to 10c and the communication wire 2' having the same constitution as that of the communication wire 2 are connected into a net shape via the relay connecting circuit 30. ECUs 41a to 41d are to be connected, and in this example, the ECUs 41a to 41d are connected by two routes. For this reason, if any one of the communication wires 2 and 2' is completely disconnected at a portion C and is incommunicable, the reliability monitoring circuit 34 or the like detects the disconnection of the communication wires 2 and 2', and the wire connection adjusting section 35 adjusts the wire connecting state. As a result, the communication network 40 can dynamically cope with a communicable environment that is the same as that before the disconnection of the wire harnesses 2 and 2'.

Figure 9:
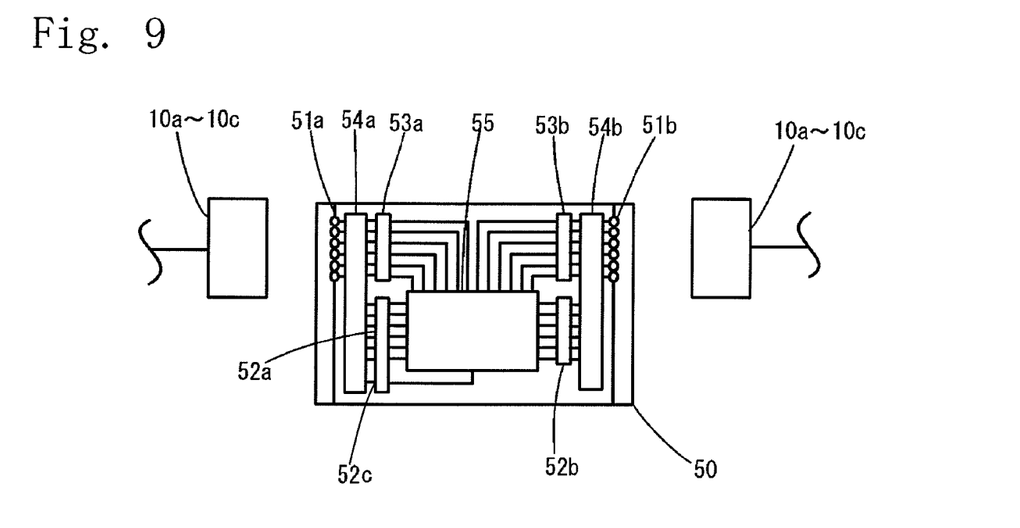
FIG. 9 is a diagram illustrating a modified example of the relay connecting circuit.

FIG. 9 is a diagram illustrating a configuration of a relay connecting circuit 50 configured so that the communication cable using the communication circuits 10a to 10c can be connectable. The relay connecting circuit 50 has relay input/output sections 51a and 51b, internal signal output sections 52a and 52b, internal signal input sections 53a and 53b, input/output circuits 54a and 54b, and a grid-shaped wire connecting circuit 55. The relay input/output sections 51a and 51b are connected to input/output sections of the communication circuits 10a to 10c between at least two communication cables. The internal signal output sections 52a and 52b output signals received from the relay input/output sections 51a and 51b. The internal signal input sections 53a and 53b input signals transmitted from the relay input/output sections 51a and 51b. The input/output circuits 54a and 54b output parallel signals input into the internal signal input sections 53a and 53b via the relay input/output sections 51a and 51b, and interlocks to prevent input of signals via the relay input/output sections 51a and 51b outputting the signals and simultaneously output signals input via the relay input/output sections via the internal signal output sections. The grid-shaped wire connecting circuit 55 arbitrarily connect the internal signal output sections 52 and the internal signal input sections 53 so as to switch a connecting state of the input/output sections 51a and 51b.

The relay input/output sections 51a and 51b have the approximately same constitution as that of the input/output section 11, and can be connected to the input/output sections 11 of the communication circuits 10a to 10c to be connected. In the second embodiment, the diagram where the relay input/output sections 51a and 51b are provided in two directions in order to simplify the drawing, but it goes without saying that the number and the direction of the relay input/output sections 51a and 51b to be provided can be arbitrarily set.

Since the internal signal output sections 52a and 52b and the internal signal input sections 53a and 53b are the same as the internal contact output sections 21 and the internal contact input sections 22 shown in FIG. 5, the detailed description about these constitutions is omitted. A writing port 52c is formed on any one of the internal signal output sections 52a, 52b.

The grid-shaped wire connecting circuit 55 is formed by a programmable logic device, and wire connecting information is written into the programmable logic device via the writing port 52c, so that the wire connecting state can be changed.

The connecting apparatus according to the second embodiment composes a connecting adaptor of the wire harness, thereby forming an arbitrary communication network.

Figure 10:
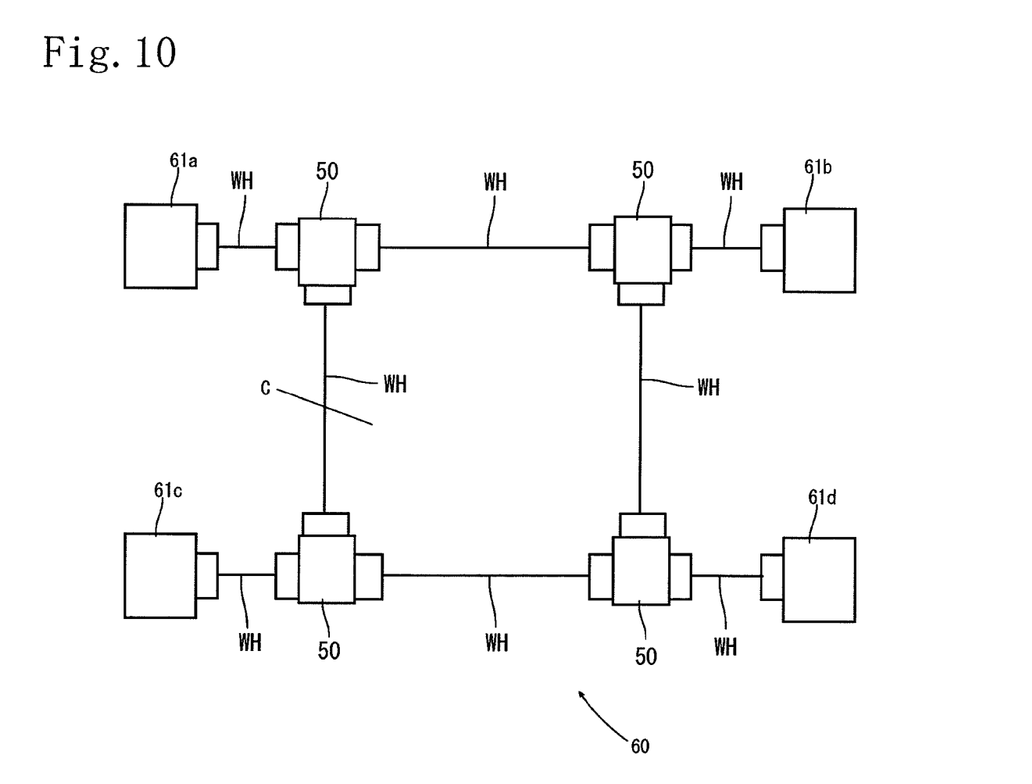
FIG. 10 is a diagram illustrating one example of the communication network using the relay connecting circuit.

FIG. 10 is a diagram illustrating one example of a communication network 60 formed by using the connecting apparatus 50. As shown in FIG. 10, in the communication network 60 according to the second embodiment, wire harnesses WH having any of the communication circuits 10a to 10c are connected into a net shape via the relay connecting circuit 50. ECUs 61a to 61d are to be connected, and in this example, since the ECUs 61a to 61d are connected by two routes, even if one wire harness WH is completely disconnected at a portion C and thus is incommunicable, the reliability monitoring circuit 25 detects the disconnection of the wire harness WH, and the wire connection adjusting section 26 adjusts the wire connecting state. As a result, the communication network 60 can dynamically cope with an environment such that the communication can be held similarly to the case before the disconnection of the wire harness WH.

In order to simplify the description, the constitution that is as simple as possible is described in the second embodiment, but it goes without saying that actually the communication network can be structure so that three or more routes are secured among important ECUs.

What is claimed is:

1. A pair of communication circuits, the pair of communication circuits being connected via a single communication line, the pair of communication circuits comprising:
an input and output section for inputting and outputting contact signals via the single communication line;
a transmitting section for transmitting a contact signal input via the input and output section to the communication line;
a receiving section for receiving the contact signal from the communication line;
an input and output circuit for outputting the contact signal received by the receiving section via the input and output section and performing an interlocking function based on the outputting of the contact signal to prevent input of another contact signal via the input and output section in a state of outputting the contact signal via the input and output section; and
a time division communication control section for switching a communication direction among the transmission section, the receiving section and the input and output circuit at a time-divided timing,
wherein the input and output circuit further comprises
a storage section that stores contact signal state information received by the receiving section;
a logical sum operating section for calculating and obtaining a use state of the communication line based on a logical sum of ON states in the contact signal state information stored in the storage section; and
a switch element that connects the input and output section to the transmitting section for outputting the contact signal and preventing the input of another contact signal via the input and output section based on the use state of the communication line,
wherein the input and output circuit further comprises a token call control section configured to issue tokens whose number is in accordance with a number of input and output sections at a predetermined time, and
only an input and output section with a smallest node number is a master node that issues a token call that controls operations of the other input and output sections.

2. The pair of communication circuits according to claim 1, wherein the time division communication control section includes a token control section for controlling communication according to a token passing system.

3. The pair of communication circuits according to claim 2, wherein the communication line has a wiring branching section that is branched and connected to form branched communication lines, a storage section for storing contact signals received from terminals connected to the branched communication lines, and a logical sum operating section for obtaining a logical sum of the contact signals at the terminals of the branched communication lines stored in the storage section.

4. A relay connecting circuit, comprising:
    at least one set of a transmitting section, a receiving section and a time division communication control section that is connected to at least one communication line connected to the pair of communication circuits according to claim 3;
    a plurality of internal contact output sections for outputting contact signals received by the receiving section, a plurality of internal contact input sections for inputting contact signals to be transmitted to the communication line via the transmitting section; and
    a grid-shaped wire connecting circuit for connecting the internal contact output sections and the internal contact input sections.

5. A relay connecting circuit, comprising at least one set of a transmitting section, a receiving section and a time division communication control section connected to at least one communication line connected to the pair of communication circuits according to claim 2;
    a plurality of internal contact output sections for outputting contact signals received by the receiving section, a plurality of internal contact input sections for inputting contact signals to be transmitted to the communication line via the transmitting section; and
    a grid-shaped wire connecting circuit for connecting the internal contact output sections and the internal contact input sections.

6. The pair of communication circuits according to claim 1, wherein the communication line has a wiring branching section that is branched and connected to form branched communication lines, a storage section for storing contact signals received from terminals connected to the branched communication lines, and a logical sum operating section for obtaining a logical sum of the contact signals at the terminals of the branched communication lines stored in the storage section.

7. A relay connecting circuit, comprising:
    at least one set of a transmitting section, a receiving section and a time division communication control section that is connected to at least one communication line connected to the pair of communication circuits according to claim 6;
    a plurality of internal contact output sections for outputting contact signals received by the receiving section, a plurality of internal contact input sections for inputting contact signals to be transmitted to the communication line via the transmitting section; and
    a grid-shaped wire connecting circuit for connecting the internal contact output sections and the internal contact input sections.

8. A relay connecting circuit comprising:
    at least one set of a transmitting section, a receiving section and a time division communication control section connected to at least one communication line connected to the pair of communication circuits according to claim 1;
    a plurality of internal contact output sections for outputting contact signals received by the receiving section;
    a plurality of internal contact input sections for inputting contact signals to be transmitted to the communication line via the transmitting section; and
    a grid-shaped wire connecting circuit for connecting the internal contact output sections and the internal contact input sections.

9. The relay connecting circuit according to claim 8, further comprising a relay input and output section that is connected directly to the grid-shaped wire connecting circuit and relays signals.

10. A communication network formed by connecting a plurality of communication lines into a mesh shape via the relay connecting circuit according to claim 9, wherein
    the grid-shaped wire connecting circuit is formed by a programmable logic device, the internal contact output sections have a writing port for writing wire connection information, the receiving section has a reliability monitoring circuit for counting how many times defective communication occurs or how many times proper reception cannot be carried out so as to obtain reliability of the communication lines, and
    the communication network comprises a wire connection adjusting section for adjusting wire connecting states using the grid-shaped wire connecting circuits so that a communication line with low reliability is bypassed.

11. A communication network formed by connecting a plurality of communication lines into a mesh shape via the relay connecting circuit according to claim 8, wherein
    the grid-shaped wire connecting circuit is formed by a programmable logic device, the internal contact output sections have a writing port for writing wire connection information, the receiving section has a reliability monitoring circuit for counting how many times defective communications occur or how many times proper reception cannot be carried out so as to obtain reliability of the communication lines, and
    the communication network comprises a wire connection adjusting section for adjusting wire connecting states by means of the grid-shaped wire connecting circuits so that a communication line with low reliability is bypassed.

12. A pair of communication circuits, the pair of communication circuits being connected via a single communication line, the pair of communication circuits comprising:
    a plurality of input and output sections for inputting a plurality of contact signals via the single communication line;
    a transmitting section for converting a plurality of contact signals input via the plurality of input and output sections into serial signals so as to transmit them to the communication line;
    a receiving section for parallel-converting the serial signals received via the communication line to the plurality of contact signals;
    an input and output circuit for outputting the plurality of contact signals received by the receiving section via the plurality of input and output sections and performing an interlocking function based on the outputting of the plurality of contact signals to prevent input of another contact signal via the plurality of input and output sections in a state of outputting the plurality of contact signals via the plurality of input and output sections; and
    a time division communication control section for switching a communication direction among the transmitting section, the receiving section and the input and output circuit at a time-divided timing, wherein the input and output circuit further comprises a storage section that stores contact signal state information received by the receiving section;

a logical sum operating section for calculating and obtaining a use state of the communication line based on a logical sum of ON states in the contact signal state information stored in the storage section; and a switch element that connects the plurality of input and output sections to the transmitting section for outputting the plurality of contact signals and preventing the input of another contact signal via the plurality of input and output sections based on the use state of the communication line, wherein the input and output circuit further comprises a token call control section configured to issue tokens whose number is in accordance with a number of input and output sections at a predetermined time, and only an input and output section with a smallest node number is a master node that issues a token call that controls operations of the other input and output sections.

13. The pair of communication circuits according to claim 12, wherein the time division communication control section includes a token control section for controlling communication according to a token passing system.

14. The pair of communication circuits according to claim 13, wherein the communication line has a wiring branching section that is branched and connected to form branched communication lines, a storage section for storing contact signals received from terminals connected to the branched communication lines, and a logical sum operating section for obtaining a logical sum of the contact signals at the terminals of the branched communication lines stored in the storage section.

15. A relay connecting circuit, comprising:

at least one set of a transmitting section, a receiving section and a time division communication control section that is connected to at least one communication line connected to the pair of communication circuits according to claim 14;

a plurality of internal contact output sections for outputting contact signals received by the receiving section, a plurality of internal contact input sections for inputting contact signals to be transmitted to the communication line via the transmitting section; and a grid-shaped wire connecting circuit for connecting the internal contact output sections and the internal contact input sections.

16. A relay connecting circuit, comprising at least one set of a transmitting section, a receiving section and a time division communication control section connected to at least one communication line connected to the pair of communication circuits according to claim 13;

a plurality of internal contact output sections for outputting contact signals received by the receiving section, a plurality of internal contact input sections for inputting contact signals to be transmitted to the communication line via the transmitting section; and a grid-shaped wire connecting circuit for connecting the internal contact output sections and the internal contact input sections.

17. The pair of communication circuits according to claim 12, wherein the communication line has a wiring branching section that is branched and connected to form branched communication lines, a storage section for storing contact signals received from terminals connected to the branched communication lines, and a logical sum operating section for obtaining a logical sum of the contact signals at the terminals of the branched communication lines stored in the storage section.

18. A relay connecting circuit, comprising:

at least one set of a transmitting section, a receiving section and a time division communication control section that is connected to at least one communication line connected to the pair of communication circuits according to claim 17;

a plurality of internal contact output sections for outputting contact signals received by the receiving section, a plurality of internal contact input sections for inputting contact signals to be transmitted to the communication line via the transmitting section; and a grid-shaped wire connecting circuit for connecting the internal contact output sections and the internal contact input sections.

19. A relay connecting circuit, comprising:

at least one set of a transmitting section, a receiving section and a time division communication control section connected to at least one communication line connected to the pair of communication circuits according to claim 12;

a plurality of internal contact output sections for outputting contact signals received by the receiving section, a plurality of internal contact input sections for inputting contact signals to be transmitted to the communication line via the transmitting section; and a grid-shaped wire connecting circuit for connecting the internal contact output sections and the internal contact input sections.

20. The relay connecting circuit according to claim 19, further comprising a relay input and output section that is connected directly to the grid-shaped wire connecting circuit and relays signals.

* * * * *